(12) United States Patent
Han et al.

(10) Patent No.: US 9,059,907 B2
(45) Date of Patent: Jun. 16, 2015

(54) HOME NETWORK SYSTEM AND NETWORK SETTING METHOD OF ROUTER THEREIN

(71) Applicant: Samsung Electronics Co., Ltd., Gyeonggi-do (KR)

(72) Inventors: Se-Hee Han, Seoul (KR); Ho-Yeon Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 13/946,555

(22) Filed: Jul. 19, 2013

(65) Prior Publication Data
US 2014/0022942 A1    Jan. 23, 2014

(30) Foreign Application Priority Data
Jul. 20, 2012 (KR) ......................... 10-2012-0079446

(51) Int. Cl.
| | |
|---|---|
| H04L 12/24 | (2006.01) |
| H04L 12/715 | (2013.01) |
| H04L 12/751 | (2013.01) |
| H04W 16/20 | (2009.01) |
| H04W 24/04 | (2009.01) |
| H04W 84/18 | (2009.01) |
| H04W 88/16 | (2009.01) |
| H04L 12/18 | (2006.01) |

(52) U.S. Cl.
CPC ........ H04L 41/0803 (2013.01); *H04L 12/1836* (2013.01); *H04L 45/02* (2013.01)

(58) Field of Classification Search
CPC ............ H04L 12/2834; H04L 41/0803; H04L 41/0823; H04L 41/083; H04L 41/0836; H04L 41/0866; H04L 41/0886; H04L 41/0889; H04L 41/0893; H04L 12/2416; H04L 45/02; H04L 45/58; H04L 45/583
See application file for complete search history.

(56) References Cited

U.S. PATENT DOCUMENTS

| | | | |
|---|---|---|---|
| 7,532,622 B2 | 5/2009 | Pung et al. | |
| 7,889,680 B2 | 2/2011 | Chan et al. | |

(Continued)

FOREIGN PATENT DOCUMENTS

| | | |
|---|---|---|
| EP | 2 237 501 | 10/2010 |
| JP | 2005-192027 | 7/2005 |

OTHER PUBLICATIONS

Bonjour Overview, Networking, Internet, & Web: Services & Discovery, Mar. 15, 2011, Copyright 2011 Apple Inc., pp. 36.

*Primary Examiner* — Ahmed Elallam
(74) *Attorney, Agent, or Firm* — The Farrell Law Firm, P.C.

(57) ABSTRACT

Methods and systems are provided for network setting. The network setting method includes determining, by a first router, whether the first router belongs to a top segment of a plurality of segments; generating, by the first router, a multicast packet for integrating the plurality of segments into a single segment, if the first router belongs to the top segment; and transmitting, by the first router, the multicast packet to at least one additional router included in the plurality of segments.

12 Claims, 5 Drawing Sheets

(56) References Cited

U.S. PATENT DOCUMENTS

| | | | |
|---|---|---|---|
| 8,891,404 B2* | 11/2014 | Bertani et al. | 370/254 |
| 2008/0019367 A1* | 1/2008 | Ito et al. | 370/392 |
| 2009/0116499 A1 | 5/2009 | Kokado | |
| 2010/0188971 A1* | 7/2010 | Chiang | 370/225 |
| 2011/0010437 A1 | 1/2011 | Christenson et al. | |
| 2012/0092984 A1* | 4/2012 | Mighani et al. | 370/221 |
| 2013/0007190 A1* | 1/2013 | Kumar et al. | 709/217 |
| 2013/0329746 A1* | 12/2013 | Palacios Valverde et al. | 370/401 |
| 2014/0006584 A1* | 1/2014 | He | 709/223 |

* cited by examiner

HOME NETWORK SYSTEM AND NETWORK SETTING METHOD OF ROUTER THEREIN

PRIORITY

This application claims priority under 35 U.S.C. §119(a) to Korean Application Serial No. 10-2012-0079446, which was filed in the Korean Intellectual Property Office on Jul. 20, 2012, the contents of which are incorporated herein by reference.

BACKGROUND OF THE INVENTION

1. Field of the Invention

The present invention relates generally to a home network system, and more particularly, to a home network system, which can easily integrate multiple segments of the home network system into a single segment, and a network setting method of a router in the home network system.

2. Description of the Related Art

A plurality of residential gateway devices may be installed in a home. For example, a gateway provided by an Internet Protocol Television (IPTV) company, a wired-wireless router provided by a Voice over Internet Protocol (VoIP) company, a wired-wireless router individually purchased by a user, and the like, may exist simultaneously in a network within a home.

A user may use a connection service between home network devices as well as the Internet by using devices in the home. A Zero Configuration Protocol supports an automatic discovery function for services between home network devices. However, since each network corresponding to a gateway device operates as a single segment, it is impossible for each network to communicate with another network formed by another gateway device.

Therefore, a user directly changes a network configuration after accessing a wired-wireless router setting page of a home network. If a user desires to directly set a home network, the user is required to have knowledge of the network configuration. Further, several steps are required to change the setting (i.e., the mode) of the home network. Therefore, it may be difficult for the user to change the setting of the home network.

FIG. 1 is a diagram illustrating a general home network.

Referring to FIG. 1, a home network 1 includes a modem 20 connected to the Internet 10, a first router 22, a second router 24, and a third router 26. The second router 24 or the third router 26 may be a wired-wireless router. The first router 22 is connected to the modem 20 and is assigned a Wide Area Network (WAN) Internet Protocol (IP) address from the modem 20. Further, each of the second router 24 and the third router 26 is assigned an IP address from the first router 22.

A segment formed by the first router 22 is referred to as a first segment S1, a segment formed by the second router 24 is referred to as a second segment S2, and a segment formed by the third router 26 is referred to as a third segment S3. The home network 1 of FIG. 1 includes three segments S1, S2, and S3, i.e., multiple segments. However, each of the first segment S1, the second segment S2, and the third segment S3 is an independent segment. Specifically, even when the second router 24 and the third router 26 are assigned an IP from the first router 22, the segments S2 and S3 formed by the second router 24 and the third router 26 are separate from the first segment S1 of the first router 22. Since each of the segments S1, S2, and S3 is an individual segment, it is difficult to directly communicate between devices included in each of the segments S1, S2, and S3, even when the segments are configured in the same home network.

As shown in FIG. 1, it is assumed that the first segment S1 includes an eleventh device #11, a twelfth device #12, and a thirteenth device #13, the second segment S2 includes a twenty-first device #21, a twenty-second device #22, a twenty-third device #23, and a twenty-fourth device #24, and the third segment S3 includes a thirty-first device #31, a thirty-second device #32, and a thirty-third #33. Although both the eleventh device #11 and the twenty-second device #22 access the modem 20 through the first router 22 in FIG. 1, the first segment S1 and the second segment S2 are separate segments. As a result, the twenty-second device #22 is unable to discover a service of the eleventh device #11. Likewise, the second segment S2 and the third segment S3 are separate segments. As a result, the twenty-second device #22 is unable to discover a service of the thirty-third device #33. Thus, multiple individual segments in a home may reduce usability of a network.

As described above, a user may directly access a setting page of the wired-wireless routers 22, 24, and 26, and change the network setting to communicate among the segments S1, S2 and S3. However, it may be difficult to carry out the method, because the user is required to have knowledge of a network configuration to directly change the network setting and a change of the network setting requires several steps. Another method capable of setting a gateway uses a Universal Plug and Play (UPnP) Internet Gateway Device (IGD) service. However, in this method, access to the UPnP IGD service may become impossible when the network setting goes wrong.

SUMMARY OF THE INVENTION

The present invention has been made to address at least the above problems and/or disadvantages and to provide at least the advantages described below. Accordingly, an aspect of the present invention provides a home network system, which can easily integrate multiple segments of the home network system into a single segment, and a network setting method of a router in the home network system.

According to an aspect of the present invention, there is provided a network setting method of a router in a home network system, the network setting method including determining, by a first router, whether the first router belongs to a top segment of a plurality of segments; generating, by the first router, a multicast packet for integrating the plurality of segments into a single segment, if the first router belongs to the top segment; and transmitting, by the first router, the multicast packet to at least one additional router included in the plurality of segments.

According to an aspect of the present invention, there is provided a network system, the network system including a first router for determining whether the first router belongs to a top segment of a plurality of segments of a home network, and, when the first router belongs to the top segment, generating a multicast packet for integrating the plurality of segments into a single segment and transmitting the multicast packet to the plurality segments; and at least one additional router, included in the plurality of segments, for receiving the multicast from the first router.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
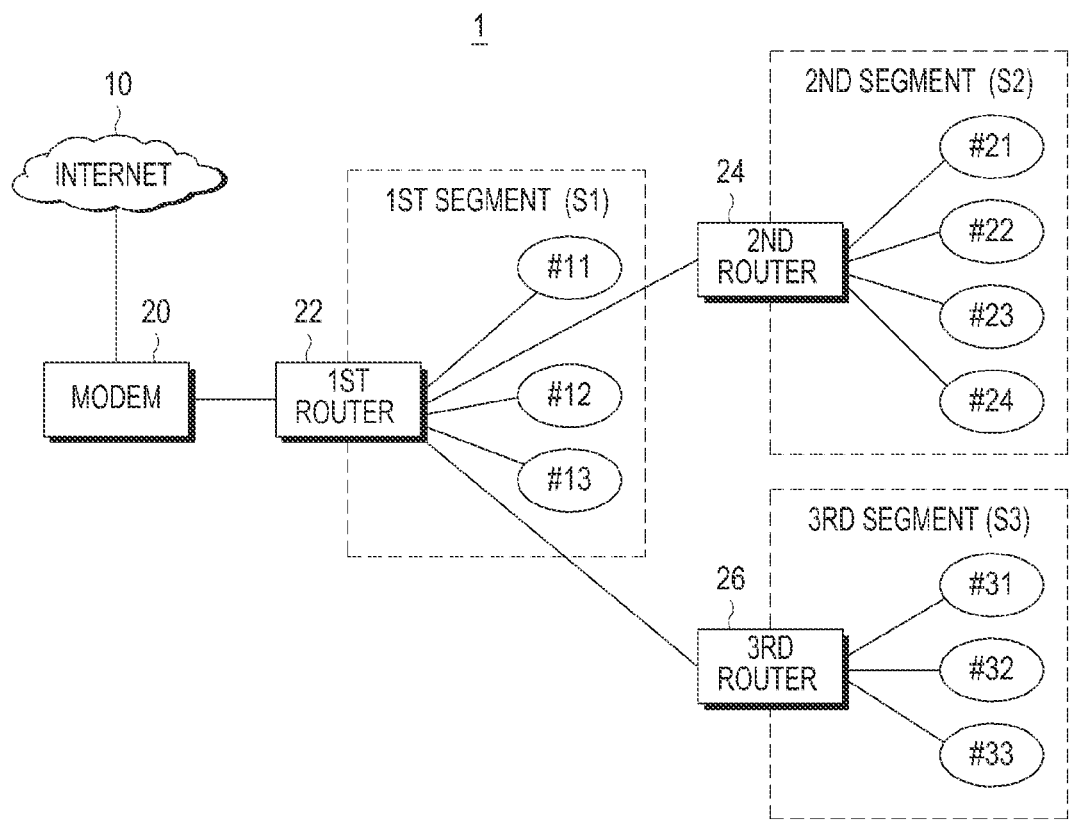
FIG. 1 is a diagram illustrating a general home network.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Further, various specific definitions found in the following description are provided only to help general understanding of the present invention.

Figure 2:
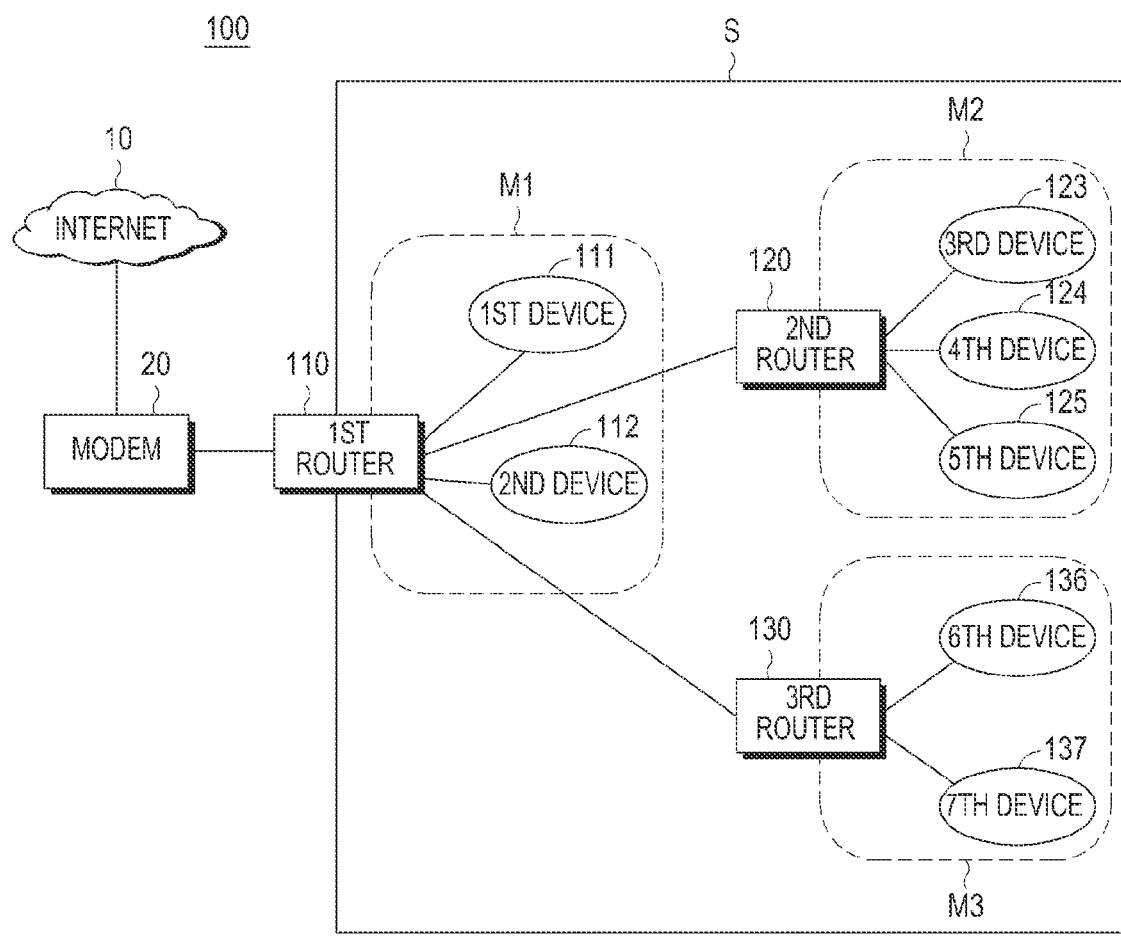
FIG. 2 is a diagram illustrating a configuration of a home network, according to an embodiment of the present invention.

FIG. 2 is a diagram illustrating a configuration of a home network, according to an embodiment of the present invention.

Referring to FIG. 2, a home network 100 is connected to the Internet 10 through the modem 20. Further, the home network includes a first router 110 accessing the Internet 10 through the modem 20, and a second router 120 and a third router 130 accessing the Internet 10 through the first router 110.

As shown in FIG. 2, the first router 110 is connected to a first device 111, the second router 120, a second device 112, and the third router 130. The second router 120 is connected to a third device 123, a fourth device 124, and a fifth device 125. The third router 130 is connected to a sixth device 136 and a seventh device 137.

The home network of FIG. 2 may include multiple segments M1, M2, and M3 formed by the routers 110, 120, and 130, respectively. A segment formed by the first router 110 is referred to as a first multiple segment M1, a segment formed by the second router 120 is referred to as a second multiple segment M2, and a segment formed by the third router 130 is referred to as a third multiple segment M3. The first device 111 and the second device 112, which are included in the first multiple segment M1, are assigned IP addresses from the first router 110. The third device 123, the fourth device 124, and the fifth device 125, which are included in the second multiple segment M2, are assigned IP addresses from the second router 120. The sixth device 136 and the seventh device 137, which are included in the third segment M3, are assigned IP addresses from the third router 130.

Embodiments of the present invention propose a method of integrating the multiple segments M1, M2, and M3, which are respectively formed by the routers 110, 120, and 130, into a single segment S. When the multiple segments M1, M2, and M3 have been integrated 20 into the single segment S, as described above, direct communication between devices 111, 112, 123, 124, 125, 136, and 137, which are included in the first to third segments M1, M2, and M3, becomes possible.

For example, it becomes possible to perform a direct communication between the first device 111, included in the first multiple segment M1, and the fourth device 124, included in the second multiple segment M2.

In FIG. 2, a router (hereinafter, referred to as "top router"), which belongs to a top segment, is directly connected to the modem 20 and assigns IP addresses to the second router 120 and the third router 130. Accordingly, a router belonging to the top segment of the home network 100 illustrated in FIG. 2, i.e., the top router, is the first router 110.

When the power of the routers has been turned on, or a switch input has been received from a user, each of the routers 110, 120, and 130, according to an embodiment of the present invention, can determine whether it is a router that belongs to the top segment, i.e., the top router. The first router 110 is directly connected to the modem 20 and is assigned a WAN IP address from the modem 20. When the first router 110 has been powered on, or a switch input has been received from a user, the first router 110 determines whether the first router 110 is a router that belongs to the top segment, i.e., the top router. Specifically, the first router 110 determines whether the segment M1 formed by the first router 110 is higher than the segments M2 and M3, formed by the second router 120 and the third router 130.

According to another embodiment of the present invention, each of the routers 110, 120, and 130 may determine that the first router 110, directly connected to the modem 20, is the top router. Each of the routers 110, 120, and 130 may determine which router is directly connected to the modem 20 by checking a network connection state of the modem 20 and the routers 110, 120, and 130, and then determine the directly connected router as the top router.

In addition, when the multiple segments M1, M2, and M3 are formed in the home network, a switch input from a user, according to an embodiment of the present invention, may be received from the user in order to change the multiple segments M1, M2, and M3 to the single segment S.

Each of the routers 110, 120, and 130, according to embodiment of the present invention, can obtain an assigned IP address, by operating as a Simple Traversal of User Datagram Protocol (UDP) through Network Address Translators (NATs) (STUN) client. Each of the routers 110, 120, and 130, according to an embodiment of the present invention, may include a STUN client. Therefore, each of the routers 110, 120, and 130 may have an account for using a STUN server. STUN clients included in the routers 110, 120, and 130 may communicate with a STUN sever, so as to enable the routers 110, 120, and 130 to obtain IP addresses of the routers 110, 120, and 130, respectively. The STUN server may be provided by a business operator or a manufacturer, which assigns an IP address in order to configure the home network.

Each of the routers 110, 120, and 130 compares an IP address of a WAN interface with a STUN result value. When the IP address of the WAN interface is identical to the STUN result value, each of the routers 110, 120, and 130 determines that it is a router that belongs to the top segment, i.e., top router. In FIG. 2, it is assumed that the first router 110 has a STUN result value identical to the IP address of the WAN interface.

The first router 110 generates a multicast packet indicating that it is the router that belongs to the top segment, i.e., the top router, and then transmits the multicast packet to other routers within the home network 100, for example, the second router 120 and the third router 130 of FIG. 2. According to an embodiment of the present invention, the first router 110 may generate the multicast packet by determining the second and third routers 120 and 130 of the home network 100 as targets.

The second and third routers 120 and 130 having WAN interfaces, IP addresses of which are different from the STUN result value, receive the multicast packet from the first router 110, and then forward (or change) their own interface to a LAN interface (I/F).

While a Dynamic Host Configuration Protocol (DHCP) server, according to an embodiment of the present invention, is being executed, the second router 120 and the third router 130 may have DHCP IP addresses assigned by the DHCP server. Therefore, the second router 120 and the third router 130 may cause the DHCP IP addresses to expire and may terminate the DHCP server, according to an embodiment of the present invention. In addition, according to another embodiment of the present invention, each of the second router 120 and the third router 130 may forward their own interface to a LAN I/F by changing a WAN port into a Local Area Network (LAN) port. According to an embodiment of the present invention, the first router 110, which is the top router, may transmit the multicast to the second router 120 and the third router 130, so as to request the second router 120 and the third router 130 to cause the DHCP IP addresses of the second router 120 and the third router 130 to expire and change the WAN ports of the second router 120 and the third router 130 into LAN ports, respectively.

When the interfaces of the second router 120 and the third router 130, having received the multicast packet from the first router 110, have been changed to LAN interfaces, the single segment S is formed based on the first router 110. Specifically, the second router 120 and the third router 130, like the first device 111 and the second device 112, may be assigned IP addresses from the first router 110 and then perform data transmission/reception.

According to an embodiment of the present invention, the first router 110 can maintain the single segment S by transmitting the multicast packet to the second and third routers 120 and 130 at every pre-stored time point. In addition, according to another embodiment of the present invention, the second router 120 or the third router 130 may include one or more switches for forming the single segment S, and may perform an operation for forming the single segment S, only when the switch input from the user is received.

When the multiple segments M1, M2, and M3 have been integrated into the single segment S, as described above, IP addresses of devices 123, 124, 125, 136, and 137, included in the second multiple segment M2 and the third multiple segment M3, may be changed. For example, before the multiple segments M1, M2, and M3 have been integrated into the single segment S, it is assumed that an IP address of the first device 111 is "10.81.1.1" and an IP address of the fourth device 124 is "192.168.1.103". When the multiple segments M1, M2, and M3 have been integrated into the single segment S by the first router 110, the IP address of the fourth device 124 may be changed to "10.81.1.4". As a result, the first device 111 may discover the fourth device 124, and it becomes possible to perform a direct communication between the first device 111 and the fourth device 124.

Figure 3:
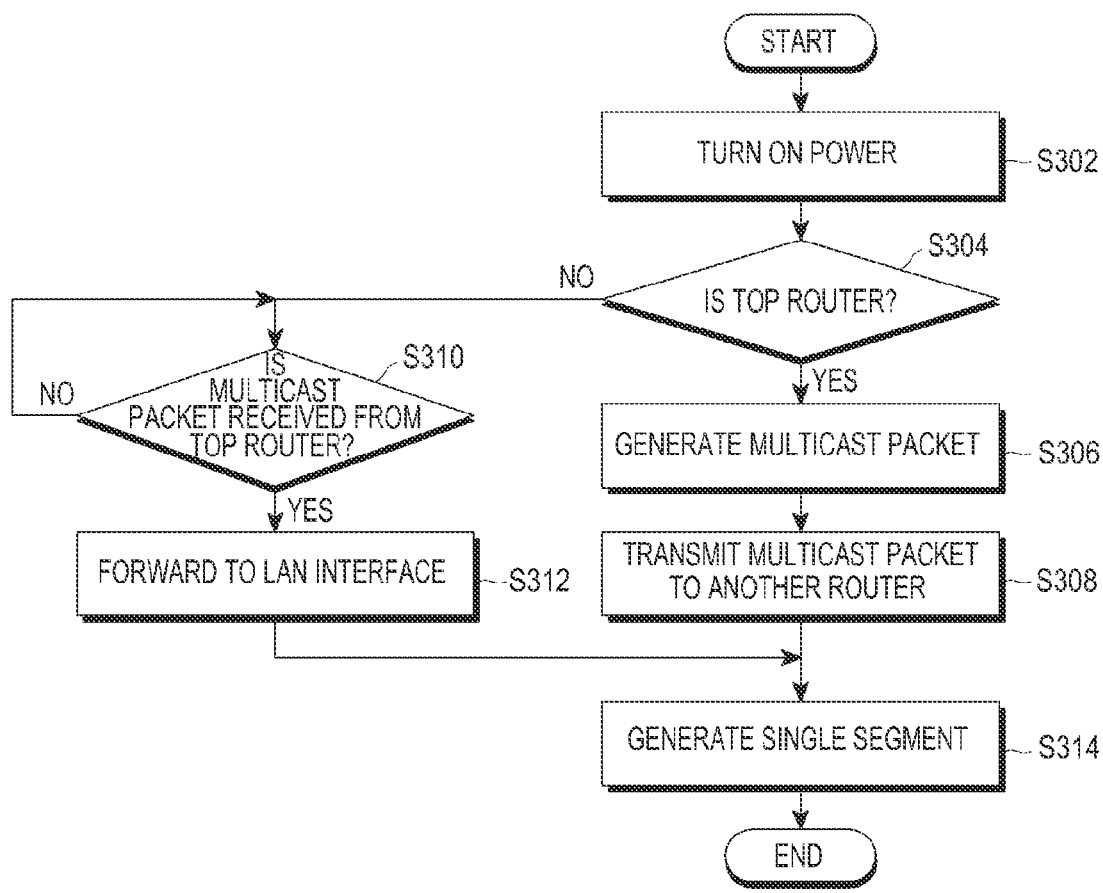
FIG. 3 is a flowchart illustrating a network setting method of the home network of FIG. 2, according to an embodiment of the present invention.

FIG. 3 is a flowchart illustrating a network setting method of the home network of FIG. 2, according to an embodiment of the present invention. It is assumed that a router performing the network setting method of FIG. 3 is the first router 110.

Referring to FIG. 3, the first router 110 is powered on, step S302, and the first router 110 determines whether it is a router belonging to a top segment, i.e. the top router, in step S304.

When the first router 110 is the top router (YES in step S304), the first router 110 generates a multicast packet for notifying another router included in the home network 100, for example, the second router 120 or the third router 130, that the first router itself is the top router, in step S306. The first router 110 transmits the multicast packet to the second and third routers 120 and 130 included in the home network 100, in step S308. When the second and third routers 120 and 130 have received the multicast packet and then changed their own interfaces to LAN I/F, the single segment S is formed by the first router 110 in the home network 100, in step S314. According to an embodiment of the present invention, the first router 110 can maintain the single segment S by transmitting the multicast packet to the second and third routers 120 and 130 at every pre-stored time point.

As a result of the determination in step 304, when the first router 110 is not the top router (NO in step S304), the first router 110 determines whether the first router 110 has received the multicast packet from the second or third router 120 or 130, i.e., whether it has received the multicast packet from a top router, in step S310. According to an embodiment of the present invention, the first router 110 may determine whether it has received the multicast packet from a top router at every pre-stored time point. When the first router 110 has received the multicast packet from the top router (YES in step S310), the first router 110 forwards the setting of the router to the LAN interface, in step S312. As a result, the single segment S is formed, in step S314.

Figure 4:
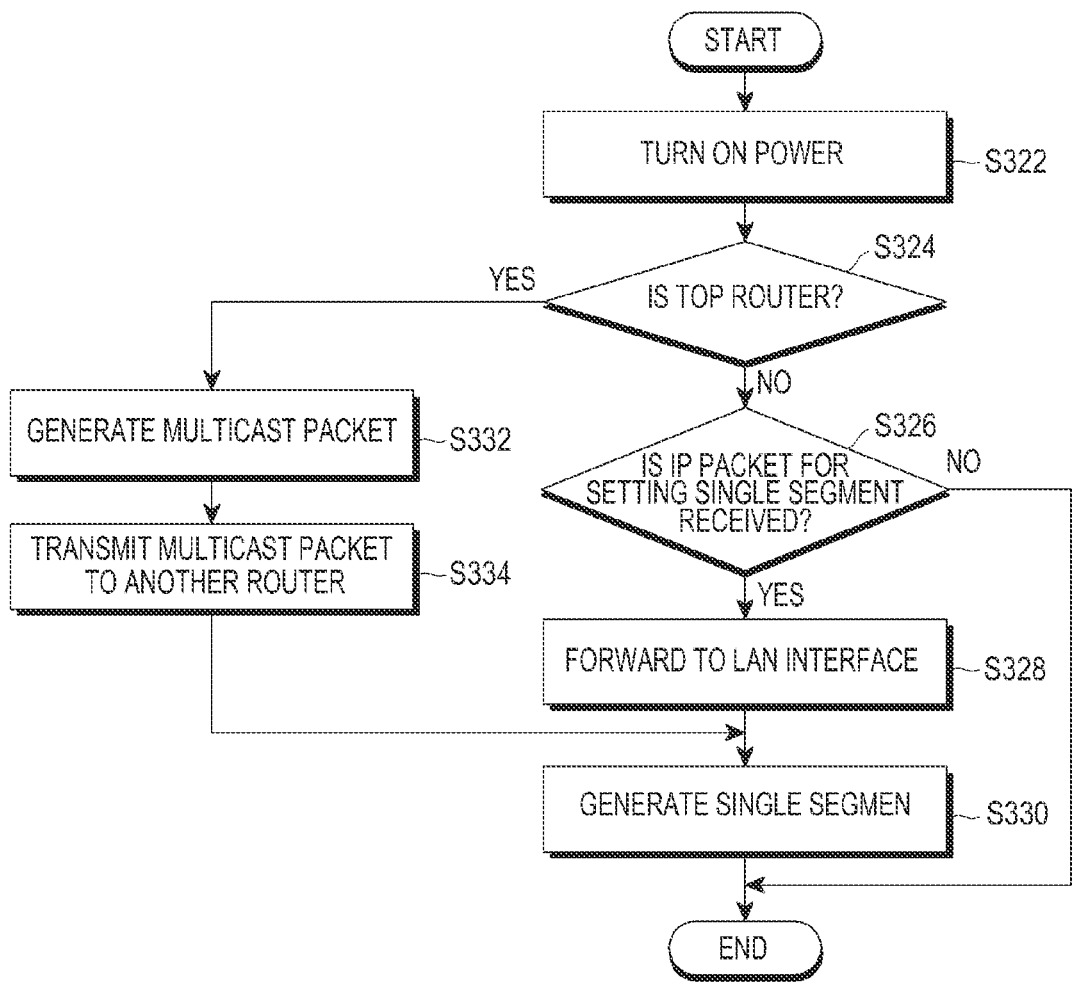
FIG. 4 is a flowchart illustrating a network setting method of the home network of FIG. 2, according to another embodiment of the present invention.

FIG. 4 is a flowchart illustrating a network setting method of the home network of FIG. 2, according to another embodiment of the present invention. It is assumed that a top router is the first router 110 in the home network of FIG. 4. The network setting method illustrated in FIG. 4 represents a network setting method of a router, i.e., the second router 120 or the third router 130, aside from the first router 110, which is the top router. Hereinafter, the second router 120 will be described as an example.

Referring to FIG. 4, the second router 120 is powered on, in step S322, and the second router 120 determines whether the second router is a top router, in step S324.

When the second router 120 is the top router (YES in step S324), the second router 120 generates a multicast packet for setting the home network to the single segment S, in step S332. When the multicast packet has been generated, the second router 120 transmits the multicast packet to another router, for example, the first router 110 or the third router 130, in step S334.

As a result of the determination in step S324, when the second router 120 is not the top router (NO in step S324), the second router 120 determines whether it has received the multicast packet for setting the home network to the single segment S, for example, an IP packet, in step S326.

When the second router 120 has received an M-Search message of a Simple Service Discovery Protocol (SSDP) from a UPnP Control Point (CP), the second router 120 is regarded as having received an IP packet for setting the home network to the single segment S. The M-Search message of the SSDP, according to an embodiment of the present invention, may be a message having been transmitted from the first router 110, which is the top router of the home network. In addition, in step S326, the IP packet received by the second router 120 may be an IP packet having a destination address of "239.255.255.250" through the SSDP. Also, the IP packet received by the second router 120 in step S326, according to another embodiment of the present invention, may be an IP packet having a destination address of "244.0.0.251" through a BONJOUR® protocol.

When the second router 120 has not received an IP packet for setting the single segment S (NO in step S326), the second router 120 does not perform a particular operation. According to an embodiment of the present invention, the second router 120 may maintain the current setting until it receives a multicast packet, for example, an IP packet from the first router 110.

When the second router 120 has received an IP packet for setting the single segment S (YES in step S326), the second router 120 forwards (or changes) its own interface from a WAN I/F to a LAN I/F, in step S328. As a result, the single segment S is formed in the home network, in step S330.

Figure 5:
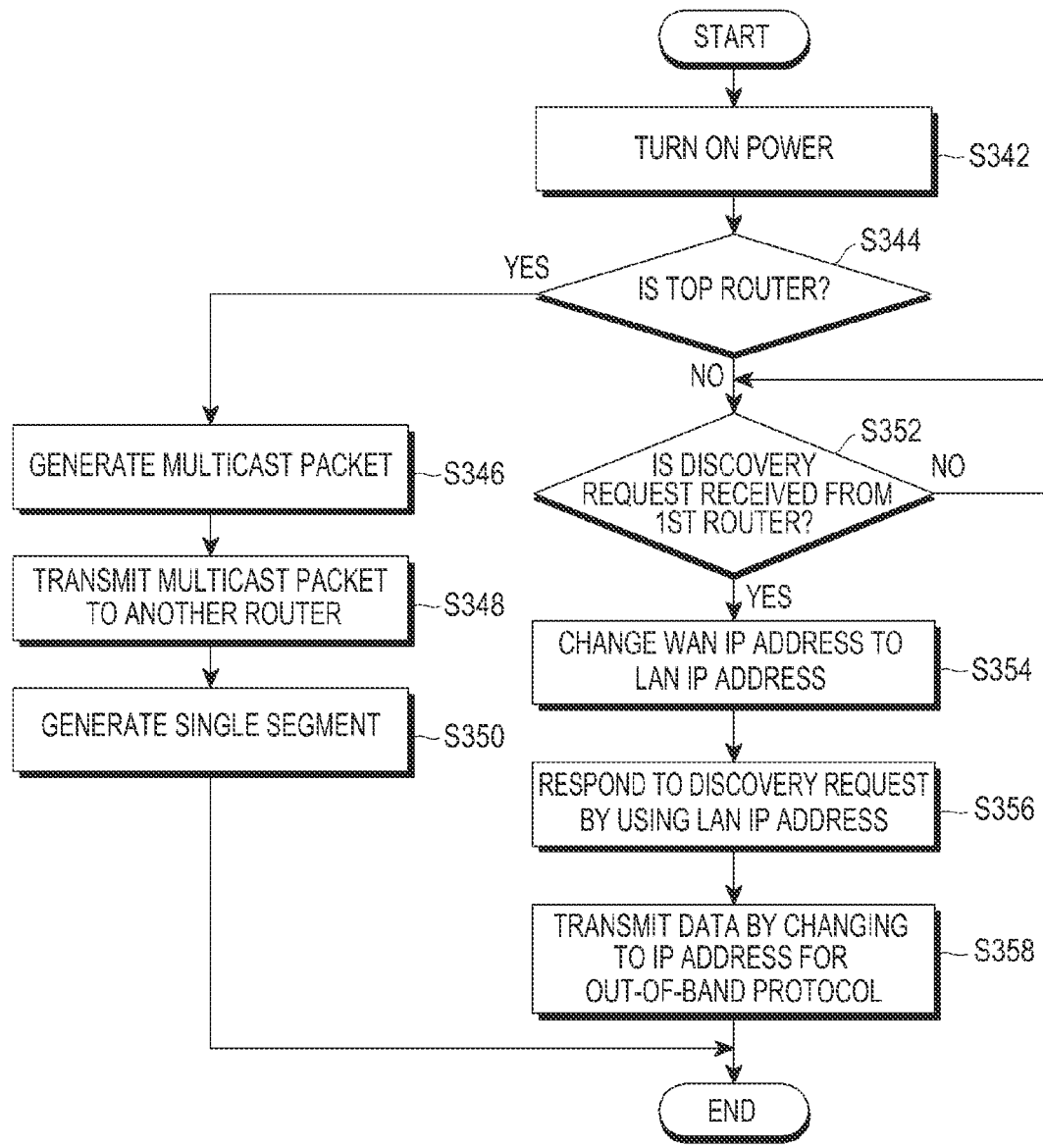
FIG. 5 is a flowchart illustrating a network setting method of the home network of FIG. 2, according to a further embodiment of the present invention.

FIG. 5 is a flowchart illustrating a network setting method of the home network of FIG. 2, according to a further embodiment of the present invention. As in FIG. 4, FIG. 5 is also based on an assumption that a router belonging to the top segment in the home network, i.e. the top router, is the first router 110. The network setting method illustrated in FIG. 5 represents a network setting method of the second router 120 or the third router 130. Hereinafter, the second router 120 will be described as an example.

Referring to FIG. 5, the second router 120 is powered on, in step S342, and the second router 120 determines whether it is a top router, in step S344.

When the second router 120 is the top router (YES in step S344), the second router 120 generates a multicast packet for setting a home network to the single segment S, in step S346. The second router 120 transmits the multicast packet to another router, for example, the first router 110 or the third router 130, in step S348. As a result, the single segment is formed in the home network, in step S350.

When the second router 120 is not the top router (NO in step S344), the second router 120 determines whether it has received a discovery request from the first router 110, which belongs to the top segment, i.e. the top router, in step S352. When the second router 120 has not received the discovery request from the first router 110 (NO in step S352), the second router 120 may wait until it receives the discovery request from the first router 110.

When the second router 120 has received the discovery request from the first router 110 (YES in step S352), the second router 120 changes a WAN IP address into a LAN IP address, in step S354. Therefore, the second router 120 may change a WAN I/F to a LAN I/F. According to an embodiment of the present invention, the second router 120 may change WAN IP addresses of the devices 123, 124, and 125 included in the second multiple segment M2 into LAN IP addresses by using an Application Layer Gateway (ALG) function. For example, the second router 120 may change an IP address of the fifth device 125 from "192.168.1.103" to "10.81.1.5", or may change an IP address of the sixth device 126 from "192.168.1.106" to "10.81.1.6".

When the home network is implemented through BONJOUR® based on an Auto Discovery protocol, according to an embodiment of the present invention, the second router 120 may change a WAN IP address into a LAN I/F address when a BONJOUR® m-DNS message is received.

When the WAN IP address has been changed into the LAN IP address, the second router 120 responds to a discovery request received in step S352 by using the LAN IP address, in step S356. According to an embodiment of the present invention, the second router 120 may notify the first router 110 of a LAN IP address changed in step S354 instead of the second router 120's own WAN IP address, as a discovery response.

The second router 120 transmits and receives data, such as, for example, a data packet, by changing an IP address by using an out-of-band protocol, in step S358. In this event, the out-of-band protocol indicates a protocol of the routers 110 and 130 corresponding to segments M1 and M3 other than the second multi segment M2 formed by the second router 120. For example, a data packet transmitted from the sixth device 136 corresponds to a data packet transmitted by using the out-of-band protocol, because the sixth device 136 is not included in the second multiple segment M2. Accordingly, when the fifth device 125 desires to transmit a data packet to the sixth device 136, the second router 120 may change a WAN IP address assigned to the fifth device 125 into a LAN IP address, and transmit a data packet including the LAN IP address to the sixth device 136.

Further, the operation performed in step S358 may be performed in a state in that the first multiple segment M1 by the first router 110 and the second multiple segment M2 by the second router 120 have not been integrated with each other. Specifically, the second router 120 may change a WAN IP address into a LAN IP address by utilizing the ALG function, so as to enable the second router 120 to operate in the same way as that in which the devices 123, 124, and 125 included in the second multiple segment M2 have been assigned LAN IP addresses by the first router 110. According to an embodiment of the present invention, the devices 123, 124, and 125 included in the second multiple segment M2 may change data, which is transmitted and received from not only the first router 110 and the third router 130, but also the outside, into an IP address for the out-of-band protocol, and then transmit and receive the data.

Although not illustrated in FIG. 5, when a home network, according to another embodiment of the present invention, is implemented through BONJOUR®, a WAN IP address may be changed into a LAN IP address by changing a service (SRV) Record port of a Service Publication message. A SRV Record of BONJOUR® includes a Host name and a Port number. Therefore, the routers, according to an embodiment of the present invention, may change a WAN IP address to a LAN IP address by changing the Host name or the Port number.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A network setting method of a router in a home network system, the method comprising the steps of:
    determining, by a first router, whether the first router belongs to a top segment of a plurality of segments;
    generating, by the first router, a multicast packet for integrating the plurality of segments into a single segment, if the first router belongs to the top segment; and
    transmitting, by the first router, the multicast packet to at least one additional router included in the plurality of segments.

2. The method of claim 1, wherein determining whether the first router belongs to the top segment comprises:
    determining, by the first router, whether a Wide Area Network (WAN) Internet Protocol (IP) address of the first router is identical to a Simple Traversal of User Datagram Protocol (UDP) through Network Address Translators (NATs) (STUN) result value when the first router operates as a STUN client; and
    determining, by the first router, that the first router belongs to the top segment, if the WAN IP address of the first router is identical to the STUN result value.

3. The method of claim 1, wherein the multicast packet is generated by targeting the at least one additional router and the multicast packet indicates that the first router belongs to the top segment.

4. The method of claim 1, wherein the first router transmits the multicast packet to the at least one additional router at every pre-stored time point.

5. The method of claim 1, further comprising:
determining, by the first router, whether the first router has received the multicast packet from a second router, which belongs to the top segment, from the at least one additional router, if the first router does not belong to the top segment; and
if the first router has received the multicast packet from the second router, changing, by the first router, a WAN interface of the first router to a Local Area Network (LAN) interface.

6. The method of claim 1, further comprising:
determining, by the first router, whether the first router has received an IP packet for setting a home network to a single segment, if the first router does not belong to the top segment; and
if the first router has not received the IP packet, changing, by the first router, a WAN interface of the first router to a LAN interface.

7. The method of claim 6, wherein the IP packet is an M-Search message of a Simple Service Discovery Protocol (SSDP).

8. The method of claim 1, further comprising:
if the first router does not belong to the top segment, determining, by the first router, whether the first router has received a discovery request from a second router, which belongs to the top segment, from the at least one additional router;
if the first router has received the discovery request from the second router, changing, by the first router, a WAN IP address of the first router into a LAN IP address; and
responding, by the first router, to the discovery request using the LAN IP address.

9. The method of claim 8, further comprising:
if data has been received through an out-of-band protocol, changing an IP address of the data into the LAN IP address, by the first router.

10. A home network system comprising:
a first router for determining whether the first router belongs to a top segment of a plurality of segments of a home network, and, when the first router belongs to the top segment, generating a multicast packet for integrating the plurality of segments into a single segment and transmitting the multicast packet to the plurality segments; and
at least one additional router, included in the plurality of segments, for receiving the multicast from the first router.

11. The home network system of claim 10, wherein the multicast packet is generated by targeting the at least one additional router, and the multicast packet indicates that the first router belongs to the top segment.

12. The home network system of claim 10, wherein the first router determines whether a Wide Area Network (WAN) Internet Protocol (IP) address of the first router is identical to a Simple Traversal of User Datagram Protocol (UDP) through Network Address Translators (NATs) (STUN) result value if the first router operates as a STUN client, and the first router determines that the first router belongs to the top segment if the WAN IP address of the first router is identical to the STUN result value.

* * * * *